Patented Sept. 26, 1922.

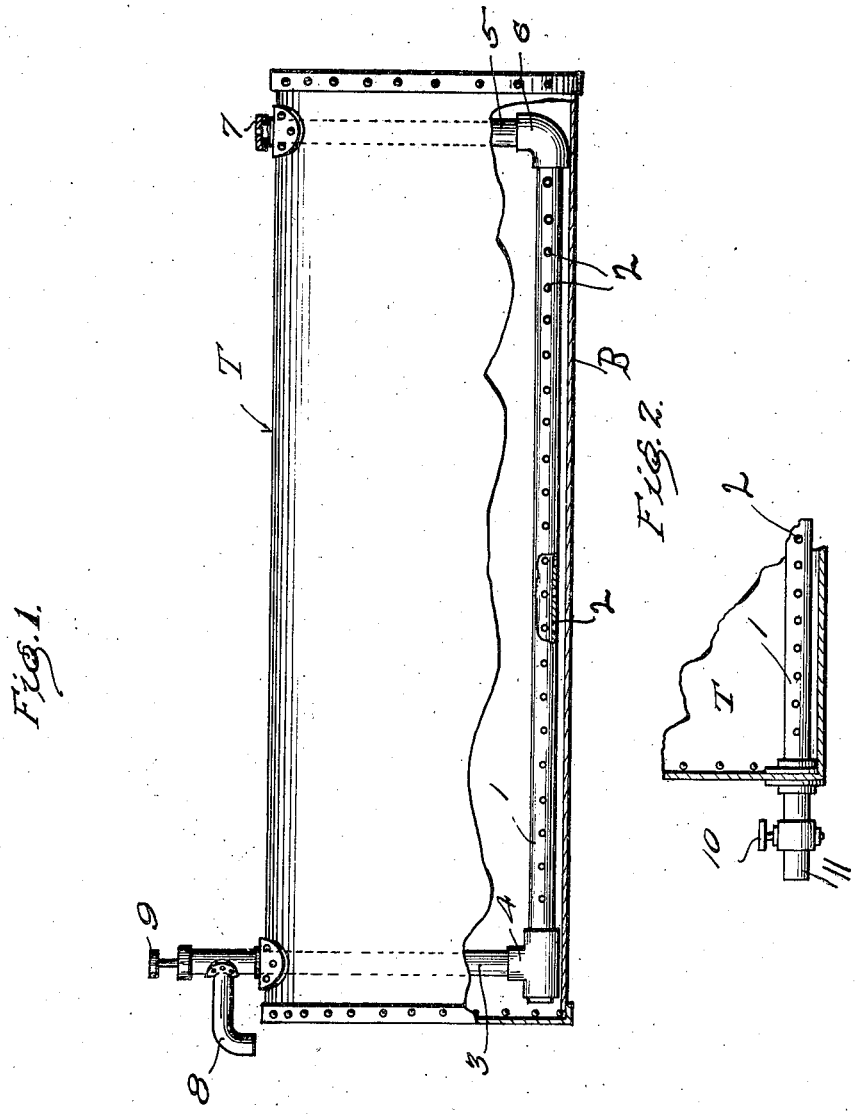

1,430,425

UNITED STATES PATENT OFFICE.

JOSEPH WIDME, OF TWIN VALLEY, MINNESOTA.

WATER DRAIN FOR GASOLINE TANKS.

Application filed March 1, 1920. Serial No. 362,499.

*To all whom it may concern:*

Be it known that I, JOSEPH WIDME, a citizen of the United States, residing at Twin Valley, in the county of Norman and State of Minnesota, have invented certain new and useful Improvements in Water Drains for Gasoline Tanks, of which the following is a specification.

This invention relates to improvements in gas storage and supply tanks and more particularly to means for removing water therefrom.

The object of the invention is to provide simple and efficient means for removing any and all water which may have accumulated in gas or oil storage tanks regardless of the quantity of the gas or oil which is contained in the tank, it being well known that gas and oil will float on water. Large storage or supply tanks either surface or underground will frost on the inside in cold weather and this frost melts and forms water in the tank; and often times the gas contains water when placed in the tank. This water settles in the bottom of the tank, the gas floating thereon. Should the water be pumped out with the gas and supplied to automobiles it will cause considerable trouble, hence it is desirable that it be removed from the tank and it is to accomplish this result that this invention is designed.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a side elevation of an under-ground gas storage tank equipped with this invention, parts being broken out and in section; and Fig. 2 is a detail longitudinal section of a surface tank equipped with this improvement.

In the embodiment illustrated in Fig. 1 an underground gas storage tank T is shown which may be of any desired size or construction and in which is mounted at the bottom thereof a longitudinally extending pipe 1 which is of a length substantially equal to that of the length of the tank. This pipe 1 is provided with a plurality of apertures 2 opening through the bottom and side walls thereof and decreasing in size from its rear or air inlet end to its discharging end.

An upstanding water discharge pipe 3 is connected with one end of the pipe 1 by T-coupling 4. This pipe 3 projects through the top of the tank above the surface in which it is embedded and has a discharge spout 8 and a plunger of ordinary construction having a head 9 mounted to be reciprocated in the pipe 3 for withdrawing the water from pipe 1.

The other end of pipe 1 has an upstanding pipe 5 shown connected therewith by an elbow 6 and this pipe 5 opens through the top of the tank T and is equipped with an apertured closure 7 to permit the entrance of air into the pipe 1 and prevent the formation of a vacuum.

The pipe 1 may be of any desired size, being preferably about two inches in diameter and the apertures 2 are about one-half inch in diameter and gradually decrease in size to about one-quarter inch. The pipe 1 is located adjacent the bottom B of the tank T, being preferably spaced therefrom about one-eighth inch to permit the water settling at the bottom of the tank to surround it on all sides so that said water will be drawn into the pipe through the apertures 2 when the plunger is reciprocated in pipe 3 and will be discharged through the nozzle or faucet 8.

By so disposing this pipe 1 and extending it throughout the length of the tank, all of the water accumulated in the tank may be withdrawn therefrom and thus insure undiluted gasoline being supplied to customers.

In Fig. 2 the tank T is the same as that shown in Fig. 1 except that it is designed to be mounted on the surface instead of under ground and in a surface tank it is not necessary that the drain pipe 1 have an upstanding discharge pipe 3 since obviously the water collected in pipe 1 may be discharged on the same level and as shown this pipe 1 has an extension 11 projecting through one end of the tank and equipped with a controlling valve or cock 10, so that when this valve 10 is opened the water in the pipe 1 will flow out and be discharged through the extension 11.

From the foregoing description taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent is:

The combination with an oil storage tank, of a perforated pipe, said perforations increasing from small at one end of pipe to large at the other; an upstanding discharge pipe connected at first mentioned end of pipe, a plunger mounted in said discharge pipe to create a suction, an upstanding air inlet pipe connected at opposite end of longitudinal perforated pipe, both of said upstanding pipes extending above the tank, and a cap having an aperture mounted on end of said air inlet pipe.

In testimony whereof I affix my signature in presence of two witnesses.

JOSEPH WIDME.

Witnesses:
O. S. HELLERUD,
P. N. DRAXTER.